June 13, 1967 G. A. REESE ET AL 3,325,821

MULTISPOT TRANSDUCER

Filed Feb. 26, 1965 3 Sheets-Sheet 1

INVENTORS:
Glenn A. Reese
Donald H. Westermeier
By Smyth, Roston & Pavitt
Attorneys INVENTORS:
Glenn A. Reese
Donald H. Westermeier
By Smyth, Roston & Pavitt
Attorneys

MULTISPOT TRANSDUCER

Filed Feb. 26, 1965

INVENTORS:
Glenn A. Reese
Donald H. Westermeier
By Smyth, Roston & Pavitt
Attorneys 3,325,821

MULTISPOT TRANSDUCER

Glenn A. Reese, San Pedro, and Donald H. Westermeier, North Hollywood, Calif., assignors to The Magnavox Company, Torrance, Calif., a corporation of Delaware Filed Feb. 26, 1965, Ser. No. 435,651
16 Claims. (Cl. 346—104)

The present invention relates to facsimile systems and more particularly to printing transducer means for use in facsimile systems for printing a facsimile in response to electrical facsimile signals.

There are many applications where it is necessary to print at a high rate of speed in response to an analog electrical signal. For example, in a facsimile system, the receiving unit is provided with a facsimile signal that represents the contents of an original document. In many facsimile systems the signal is of an analog type that varies continuously over a predetermined range. The receiving unit employs printing transducer means that respond to the facsimile signal and print on a blank piece of copy paper. A facsimile system of this type is disclosed and claimed in copending application Ser. No. 176,258, entitled, "Facsimile System," filed Feb. 22, 1962, in the names of Glenn Reese and Paul Crane, and assigned of record to The Magnavox Company, and now abandoned.

The system employs a transceiver which may be operated in either a transmit mode or in a receive mode. When the transceiver is operating in a transmit mode, pickup transducer means scan the document to be reproduced and produce an analog base band signal that corresponds to the contents of the document. The base band signal is then modulated onto a carrier and acoustically or otherwise coupled into a suitable transmission line such as a conventional telephone line. When the transceiver is operating in a receive mode, the modulated carrier is acoustically or otherwise decoupled from the transmission line and demodulated to provide the original base band signal representing the contents of the document. The base band signal is then fed to a printing transducer that prints on a blank piece of copy paper to produce a facsimile of the document.

A pressure-sensitive writing material such as an ink ribbon or carbon paper overlies the copy paper. The printing transducer includes an armature having a stylus which is effective to scan across the pressure-sensitive material in a series of parallel lines and exert a pressure proportional to the base band signal. The pressure-sensitive writing material is thereby deposited upon the blank piece of copy paper in the form of a facsimile of the document.

The armature is preferably extremely light weight whereby it can be operated at a high rate of speed and produce a high quality facsimile. It has been found that under some operating conditions the lightweight armature may malfunction. More particularly, under some circumstances the response time of the armature and the amount of pressure it applies to the writing material varies so that the facsimile possesses certain degradations. It has also been found that, under some circumstances, mechanical transients may occur which cause a malprinting and further degradation of the facsimile.

The present invention provides a facsimile system and printing transducer means therefor which overcome the foregoing difficulties. More particularly, the present invention provides printing transducer means which are responsive to analog signals to produce a faithful reproduction or facsimile. This is accomplished by transducer means which are not only effective to produce a printing force that is a direct function of the strength of the signal but are also free from any variations in operating characteristics or transients.

In one of the embodiments of the present invention, this is accomplished by providing printing transducer means having a lightweight armature and printing stylus for riding upon a pressure-sensitive writing material overlaying a blank piece of copy paper. Means are also provided which are effective to control the movement of the stylus and armature so as to insure an accurate positioning of the stylus relative to the pressure-sensitive writing material whereby the movement of the stylus will be very accurately produced.

These and other features and advantages of the present invention will become more readily apparent from the following detailed description of a limited number of embodiments thereof, particularly when taken in connection with the accompanying drawings wherein like reference numerals refer to like parts and wherein.

Figure 1:
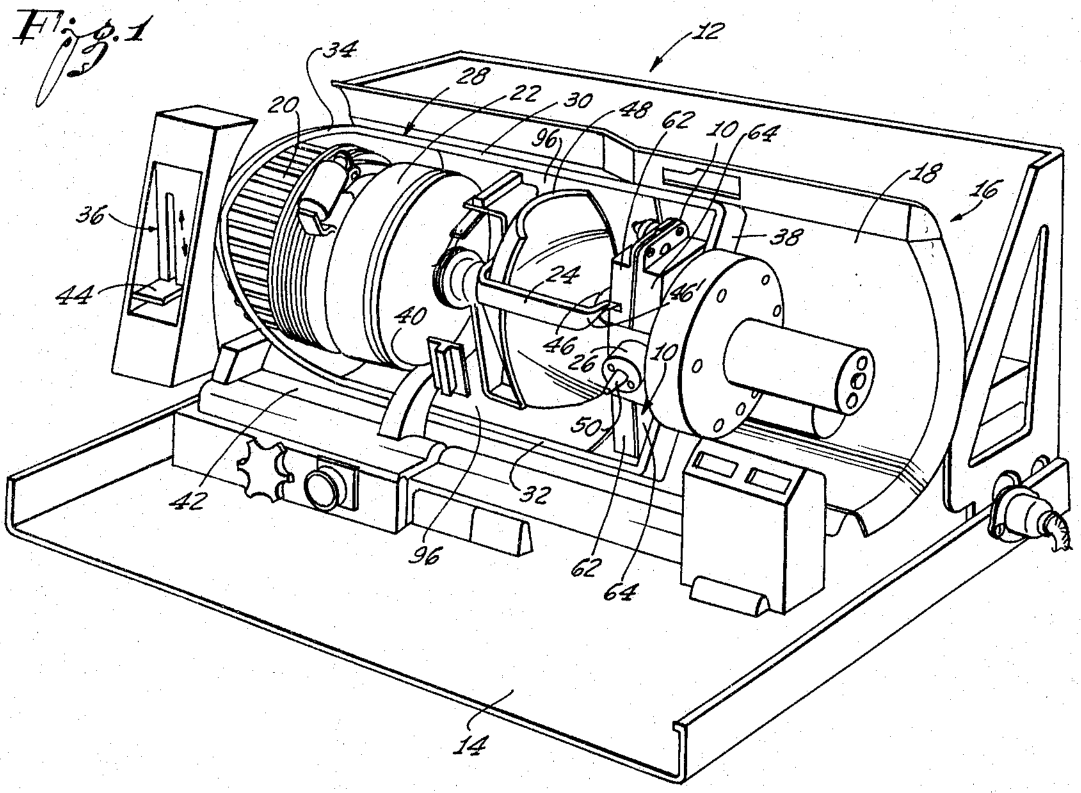
FIGURE 1 is a perspective view of a transceiver embodying a printing transducer employing one form of the present invention.
Figure 2:
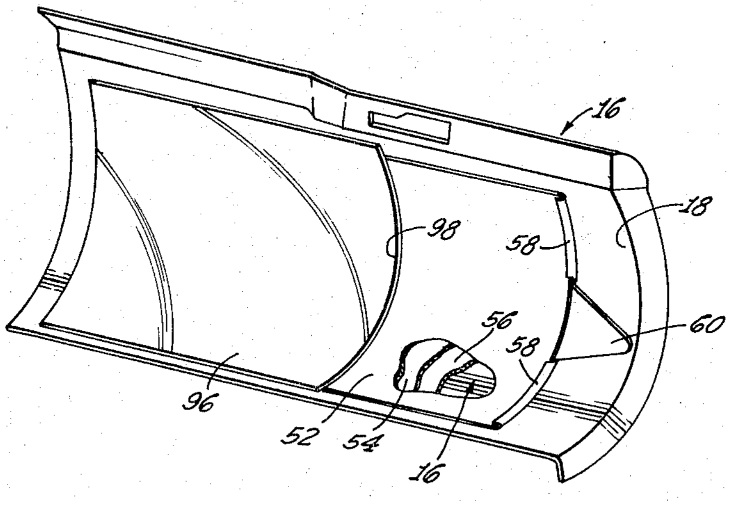
FIGURE 2 is a perspective view of a portion of the transceiver of FIGURE 1 and particularly the platen and copy paper mounted thereon.
Figures 3, 4:
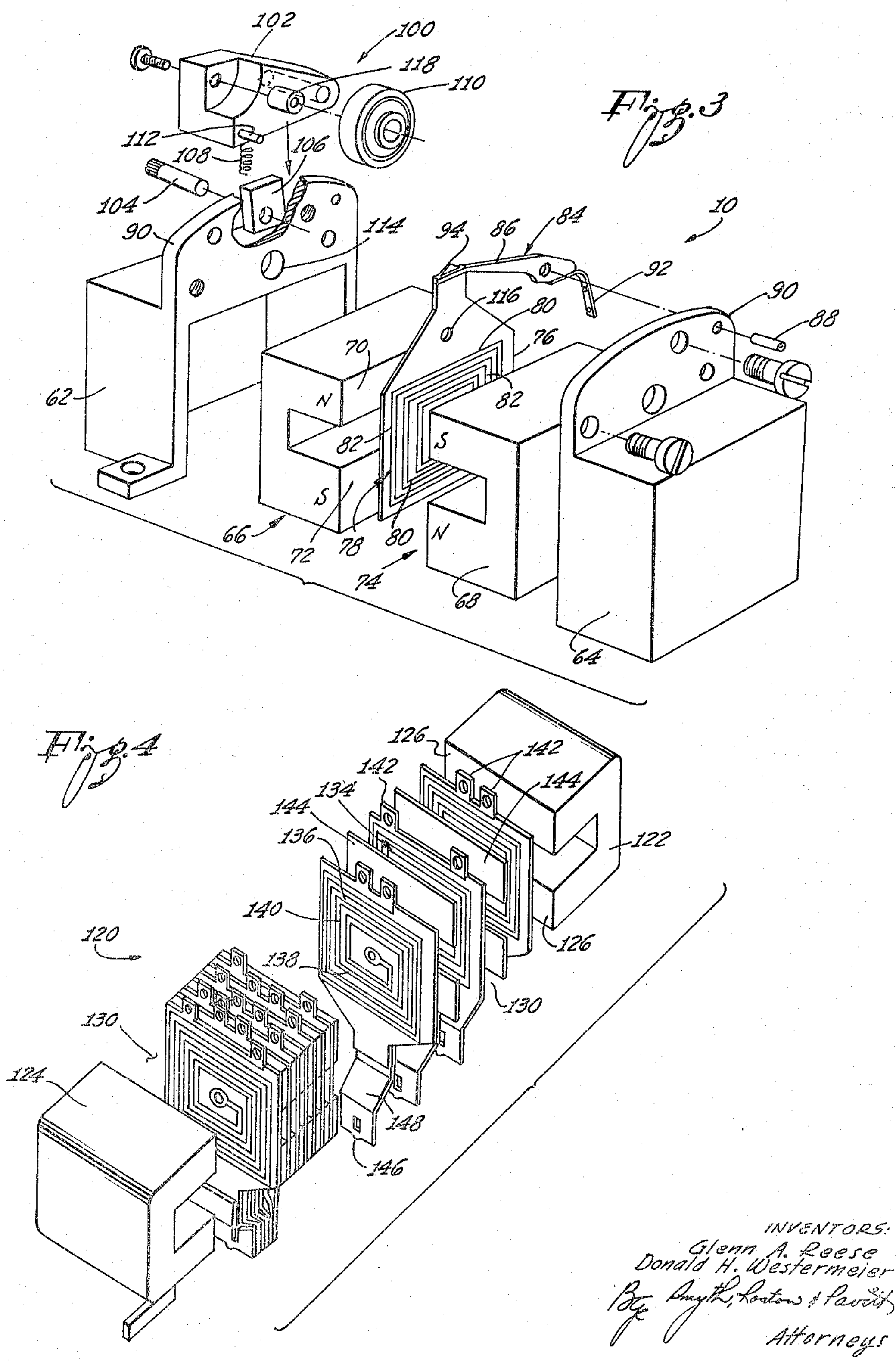
FIGURE 3 is an exploded perspective view of a printing transducer employed in the transceiver of FIGURE 1.
FIGURE 4 is an exploded perspective view of a printing transducer suitable for use in the transceiver of FIGURE 1 and embodying another form of the present invention.

Referring to the drawings in more detail, and particularly to FIGURES 1 to 3, inclusive, the present invention is embodied in a printing transducer means 10 which is particularly adapted to be used in a transceiver 12 for a facsimile system. Although the transceiver 12 may be of any desired variety, in the present instance it is substantially identical to the transceiver disclosed and claimed in copending application Ser. No. 549,759 filed Apr. 21, 1966 in the names of Glenn A. Reese and Paul J. Crane (continuation of Ser. No. 176,248 filed Feb. 28, 1962, now abandoned) and assigned of record to The Magnavox Company.

This transceiver 12 may be operated in a transmit mode for generating and transmititng video facsimile signals, or, alternatively, it may be operated in a receive mode for receiving the video or facsimile signals and reproducing a facsimile of the original document. The transceiver 12 includes a base 14 upon which a platen 16 is mounted. Although this platen 16 may be fabricated by any suitable means, in the present instance it is a sheet metal stamping having an inner surface 18 sufficiently smooth to permit the document and/or copy paper to be advanced therealong. The platen 16 includes a portion which is substantially cylindrical.

The various operative elements of the transceiver 12 such as a drive motor 20, a synchronizing clutch 22, a yoke 24, pickup transducer means 26 and the printing transducer means 10 may be mounted on a cradle 28 disposed in front of the platen 16.

The cradle 28 includes upper and lower sides 30 and 32 arranged substantially parallel to the top and bottom of the platen 16. The first end of the cradle 28 includes a cross member 34 that is supported by a paper release 36 while the center is pivotally mounted on the end of a support arm 40. The second end of the cradle includes another cross member 38.

The paper release 36 and the arm 40 are pivotally secured to the base 14 by means of a hinge 42. The cradle 28 is thereby free to swing between an operative position adjacent the platen 16 and a service position remote from the platen 16. The paper release 36 includes a mechanism such as an overcenter linkage having a control lever 44. When the lever 44 is moved to one position the cradle 28 rotates about the arm 40 and away from the platen 16 to provide a clearance space that allows a document or copy paper to be placed on the platen 16. When the lever 44 is moved to the other position, the cradle 28 swings around the arm 40 in the opposite direction toward the platen 16 whereby the document or copy paper will be clamped into position on the platen 16.

The drive motor 20 is preferably a synchronous motor that runs at a synchronous speed precisely related to only the frequency of the power. Thus, if the powers supplied to the transmitting and receiving motors have identical frequencies, the motors will run at identical speeds. This will insure the pickup and printing transducers 10 and 26 being driven at precisely identical speeds.

The synchronizing clutch 22 drivingly connects the drive motor 20 to the yoke 24. This clutch 22 is effective to permit the phase of the printing transducer means 10 in the receiving unit to be varied relative to the phase of the transducers 26 in the transmitting unit whereby the phase of the printing transducer means 10 may be brought into synchronism with the phase of the pickup transducer means 26. Although this synchronizing clutch 22 may be of any desired variety, in the present instance the synchronizing clutch is substantially identical to the clutch disclosed and claimed in copending application Ser. No. 549,759 filed Apr. 21, 1966 in the names of Glenn A. Reese and Paul J. Crane (continuation of Ser. No. 176,248 filed Feb. 28, 1962, now abandoned) and assigned of record to The Magnavox Company.

One end of the yoke 24 is connected directly to the clutch 22 and rotates therewith. The opposite end of the yoke 24 includes a cross arm 46' which is rotatably supported by the end member 38 on the cradle 28. The cross arm 40 may act as a turntable for carrying the pickup transducer means 26 and the printing transducer means 10. It should be noted that, although any desired number and any desired type of transducer means 10 and 26 may be employed, in the present instance there are a pair of pickup transducer means 26 and a pair of printing transducer means 10 for scanning the material on the platen 16. As a result, even though the platen 16 subtends an arc on the order of 180° or less, one or the other of the transducers in a pair will be scanning the platen 16 and the backstroke between the successive scans will still be very short.

The pickup transducer means 26 may be of any desired variety. However, in the present instance they are substantially identical to that disclosed and claimed in copending application Ser. No. 549,759 filed Apr. 21, 1966 in the names of Glenn A. Reese and Paul J. Crane (continuation of Ser. No. 176,248 filed Feb. 28, 1962, now abandoned) and assigned of record to The Magnavox Company. More particularly, pickup transducer means 26 employs a lamp 46 mounted on the cross arm of the yoke 24 at substantially the center of rotation. A pair of parabolic mirrors 48 are carried by the yoke 24 for focusing the light from the lamp 46 into two bright spots disposed on the opposite sides of the yoke 24. The bright spots are in the field of view of the pickup means 26 and will travel accross a document on the platen 16 as the yoke 24 rotates. Lenses are provided in the housings 50 to focus the light reflected from the bright spots onto a photoelectric cell. The cell will then produce a baseband signal which corresponds to the reflectivity of the document as it is being scanned by the pickup transducer means 26.

The resultant base band signals produced by the photoelectric cell may then be transmitted to the receiver. Although this may be accomplished by any desired means, in the present instance a frequency modulation system similar to that disclosed and claimed in copending application Ser. No. 549,759 filed Apr. 21, 1966 in the names of Glenn A. Reese and Paul J. Crane (continuation of Ser. No. 176, 248 filed Feb. 28, 1962, now abandoned) and assigned of record to The Magnavox Company, is employed. The system is effective to frequency modulate a carrier wave with a baseband signal and couple the frequency modulated carrier onto a conventional telephone transmission line.

The transmitted signals are decoupled from the telephone lines by a transceiver operating in the receive mode. The receiving transceiver includes a frequency demodulation system similar to that in said application Ser. No. 549,759 filed Apr. 21, 1966 (continuation of Ser. No. 176,248 filed Feb. 28, 1962, now abandoned). This system demodulates the carrier and recovers the original baseband signal and supplies it to the printing transducer means 10 for printing on the copy paper.

The printing transducer means 10 may be of any desired variety capable of responding to the baseband signal and then printing on a suitable copy paper. However, in the present instance, the printing transducer means 10 are effective to coact with a pressure-sensitive writing material so as to print on a blank piece of paper 54. The pressure-sensitive writing material may be an ink ribbon, or, as in the present instance, it may be in the form of a piece of carbon paper 52.

In order to facilitate the handling of the combination of a blank piece of copy paper 54 and a piece of carbon paper 52, a suitable holder 56 may be provided. In the present instance, the holder 56 is fabricated from a flexible material such as a heavy gauge metal foil, etc., having a width equal to or slightly greater than the width of the blank paper 54 and/or the carbon paper 52. A pair of tabs 58 may be formed on the leading edge of the holder 56. These tabs 58 are adapted to fold over the leading edges of the blank paper and carbon paper 54 and 52 and retain the two sheets in a fixed position on the holder 56. A tongue 60 may be provided on the leading edge of the holder 56 to facilitate the handling of the holder 56 without exerting any pressure on the carbon paper 52 and to facilitate the initial feeding of the holder and papers through the transceiver. It will be seen that the blank and carbon papers will thus be combined into a single unit that is easy to handle. Due to the flexibility of the holder 56 and papers 52 and 54 secured thereto, they may be placed on the platen 16 and formed into the same arcuate shape.

During the scanning of the document by the pickup transducer means 26 and of the copy paper 54 by the printing transducer means 10, a paper drive advances them axially along the platen 16. The paper drive is disposed behind the platen 16 and includes friction wheels that project through the platen 16 and drive the document or holder 56. The advance may be intermittent or continuous and is equal to the width of a scan line for each half revolution of the yoke 24.

The printing transducer means 10 are effective to exert a pressure against the carbon paper 52 in proportion to the magnitude of the baseband signal as they ride across the platen 16. This pressure forces the carbon paper 52 against the blank paper 54 and prints a mark on the paper 54. More particularly, as may best be seen in FIGURE 3, each of the printing transducer means 10 includes a pair of mating housing members 62 and 64. These members 62 and 64 are secured to the cross member forming the end of the yoke 24 on the diametrically opposite sides of the yoke 24.

A pair of permanent magnets 66 and 68 are mounted inside of each pair of housing members 62 and 64. The magnets 66 and 68 include pairs of flat pole faces 70. The pole faces 70, which are substantially parallel to each other, are separated by relatively narrow air gaps 74 of substantially uniform thickness. The polarities of the magnets 66 and 68 are reversed so that the resultant flux field will extend across the two air gaps 74 in opposite directions.

An armature 76 is disposed between the pole faces 70 so as to be positioned in the air gaps 74 and the resultant magnetic flux fields. The armature 76 is mounted so as to be free to traverse the air gaps 74 substantially normal to the lines of flux and substantially vertically, as seen in FIGURE 3.

Although the armature 76 may be of any desired construction, it is preferably very light weight so that its position can be varied at a high rate of speed. By way of example, the armature 76 may be in the form of a relatively rigid card of non-magnetic material such as a plastic, aluminum, copper, etc. An electrically conductive winding 78 on the armature includes portions 80 that are disposed between the pole faces 70 at right angles to the magnetic flux field and to the direction of travel of the armature 76. In order to keep the armature 76 as light weight as possible, it has been found desirable for the winding 78 to be printed on the armature 76 by any well-known technique.

The winding 78 may be substantially rectangular with only the upper and lower conductors 80 disposed between the pole faces. The end conductors 82 extend across the space between the pole faces and have little, if any, effect on the movement of the armature 76. When an electric current such as the baseband signal flows through the winding 78, a dynamic flux field will be created around the upper and lower conductors 80. This field reacts with the static magnetic flux field produced by permanent magnets 66 and 68. As a consequence, a force will be produced on the armature 76 which tends to move it normal to the flux field with a force proportional to the amplitude of the current flowing within the winding 78. This force is vertical, as seen in FIGURE 3, and radially of the yoke 24, as seen in FIGURE 1.

Although the end of the armature 76 may ride on the carbon paper 52, in this embodiment a stylus 84 is provided that includes an arm 86 mounted on a pin 88 that extends between flanges 90 on the two housings 62 and 64. The arm 86 loosely fits around the pin 88 and is free to rotate. A flat section on the arm 86 engages a complementary flat spot on the end of the armature 76. A spring 92 attached to the stylus 84 and the housings 62 and 64 biases the stylus radially inwardly toward the armature.

The stylus 84 includes an apex 94 which is adapted to ride on the back of the carbon paper 52 and exert a force thereon. The apex 94 is oriented so as to engage the carbon paper 52 along a line of contact which is substantially parallel to the axes of the platen 16 and about which the yoke 24 rotates. The width of this stylus 84 is preferably substantially identical to the width of the lines scanned by the pickup transducer means 26.

The operation of the portion of the printing transducer 10 described thus far may be summarized briefly as follows. As the yoke 24 rotates, the apex 94 of the stylus 84 will ride on the surface of the carbon paper 52. The amount of force on the stylus 84 is normally inadequate to cause the carbon paper 52 to print onto the blank paper 54. The baseband signal corresponding to that developed by the transmitting pickup transducer means 26 will flow through the circuit printed on the armature 76. The resultant force tends to move the armature 76 radially in and out and vary the pressure of the stylus 84 on the carbon paper 52.

If the pickup transducer 26 is scanning a dark area, the baseband signal will have a maximum amplitude and will produce a maximum force on the armature 76. The armature 76 will then push the stylus 84 radially outwardly against the carbon paper 52 with a maximum force whereby a mark of maximum density will be produced on the copy paper 54. This condition will persist for as long as the pickup transducer 26 is scanning a dark area. As soon as a light area is being scanned, the baseband signal will decrease and the force on the armature 76 will decrease. The pressure exerted by the stylus 84 will also be reduced and the density of the resultant mark on the copy paper 54 will decrease, or the mark will entirely disappear, depending upon the nature of the original document.

It will be seen that the foregoing portion of the transducer is effective to print corresponding to the nature of the original document. However, under some circumstances, certain discontinuities may occur. For example, if the amount of force biasing the stylus 84 against the papers 52 and 54 is very abruptly increased or decreased (for example, changing from white to black or black to white), there is a tendency for a rapid and large movement of the stylus 84. Under some circumstances this may cause the stylus 84 to bounce so that the pressure of the apex 94 on the carbon paper 52 is momentarily in error. More particularly, if the document changes from white to black, the stylus 84 may bounce on the leading edge of the black mark. When this occurs, the leading edge of the printed black mark will not be a solid black but will include some white or light areas.

If the apex 94 of the stylus 84 is spaced from the carbon paper 52 or there is a space between the carbon paper 52, the blank paper 54 and/or the platen 16, there will be a time delay before the pressure on the carbon paper 52 reaches a level that will cause a printing. This delay will result in a corresponding staggering of the leading edge of the black mark. It should also be noted that if there are two separate printing transducers, as in the present instance, it is essential that the two transducers have identical characteristics in order to avoid irregularities in the printing of the facsimile.

In order to overcome the foregoing difficulties, it has been found desirable to provide first means to assist in positioning both the original document and the carbon paper, the blank paper and the holder on the platen 16, and to also provide second means for positioning the stylus 84 relative to the paper. The first means includes a paper guide having a pliable member such as a sheet 96 of plastic which tends to maintain the papers compressed against the platen 16. By way of example, this sheet 96 may be interconnected with the top and bottom sides 30 and 32 of the cradle 28. The sheet 96 will thereby have a cylindrical shape similar to that of the platen 16.

When the paper release lever 44 is moved to withdraw the cradle from the platen 16, the pliable sheet 96 will be separated from the platen 16. The original document and/or copy paper may then be easily placed between the platen 16 and the sheet 96 and then moved axially along the platen 16. However, when the paper release lever 44 is moved to force the cradle 28 toward the platen 16, the pliable sheet 96 will be compressed lightly against the platen 16. If there is a document or a copy paper thereon, the pliable sheet 96 will produce a substantially uniform radially outwardly directed pressure which tends to compress the holder 56, the blank paper 54 and carbon paper 52 all tightly together and against the platen 16. It will thus be seen that the amount of clearance between the various copying materials will be reduced to a minimum and the resiliency thereof will be substantially uniform.

The second means controls the position of the apex 94 of the stylus 84 relative to the carbon paper to thereby pjrovide a uniform printing characteristic. The end 98 of the pliable sheet 96 terminates immediately adjacent to the scan area where the printing operation is performed. A follower 100 may then be provided that travels on the pliable sheet immediately adjacent the end of the sheet and, therefore, to the scan area. The follower 100 is operatively interconnected with the stylus 84 and controls the position of the stylus 84 relative to the copy paper.

In the present instance, this follower 100 includes an arm 102 which is mounted on a pin 104 which extends between the flanges 90 and the lug 106 so as to allow the arm 102 to rotate thereabout. A spring 108 is provided between the arm 102 and the housing 62 to bias the arm 102 radially outwardly. Although the arm 102 may ride directly on the sheet 96, it has been found desirable to provide a roller 110 that travels on the surface of the pliable sheet 96. Since this roller 110 is in direct contact with the back of the pliable sheet 96, it will be seen that the arm 102 will be accurately positioned relative to the pliable sheet 96 and also to the carbon paper 52 and to the blank paper 54 underneath.

The arm 102 is interconected with the armature 76 by means of a pin 112 which projects through an enlarged opening 114 in the flange 90 on the housing 62. This opening 114 is large enough to prevent the pin 112 from engaging the flange 90 during normal operation. However, it will limit the amount of travel of the arm 102 when the roller 110 does not engage the pliable sheet 96.

The pin 112 also projects into an enlarged opening 116 in the armature 76. This opening 116 is large enough to permit the armature 76 to move relative to the pin 112 by an amount that is adequate to permit printing or not printing through the carbon paper 52. By way of example, this clearance may be on the order of about 0.005 inch.

During a printing operation the yoke 24 will be rotating and the baseband signal will be supplied to the coil 78 on the armature 76. When one of the transducers 10 swings into position to print on the copy paper 54, the roller 110 will begin to roll along the pliable sheet 96. This will cause the armature 76 and the stylus 84 to be accurately positioned relative to the carbon paper 52. As the yoke 24 rotates, the roller 110 will follow any convolutions and/or irregularities in the carbon paper 52 and platen 16. The arm 102 will then move the armature 76 in and out corresponding to these variations and maintain the stylus 84 accurately positioned relative to the carbon paper 52. However, the clearance space around the pin 112 will provide enough lost motion to permit the stylus 84 to print through the carbon paper 52.

In order to permit an adjustment of the amount of clearance, the roller 110 may be mounted on an eccentric 118. By rotating this eccentric 118, the rollers 110 in the two transducers may be moved relative to the arms 102 and vary the positions of the arms 102 relative to the sheet 96. This, in turn, will be effective to cause the armatures 76 to also be moved relative to the sheet 96 whereby the clearance spaces in the two transducers may be made equal to each other.

The foregoing printing transducer means 10 are effective to print a high quality facsimile. However, it is apparent that it can scan and print only a single line at one time. As a result, the rate at which the facsimile can be printed is correspondingly limited. If it is desired to increase the speed of the printing without increasing the bandwidth of the baseband signal, it may be desirable to employ printing transducer means similar to that disclosed in FIGURES 4 and 5.

This embodiment is effective to employ a plurality of parallel narrow band signals so as to simultaneously scan and print along a large number of parallel lines. More particularly, the transducer 120 includes a pair of permanent magnets 122 and 124. These magnets 122 and 124 correspond to the magnets 66 and 68 and may be substantially identical thereto. Each of the magnets 122 and 124 is of a U-shaped variety having a pair of parallel pole faces 126.

The two magnets 122 and 124 may be mounted on a bracket 128 or in a housing similar to the housing members 62 and 64. When the magnets 122 and 124 are mounted, the registering pole faces 126 are separated by air gaps 130. As will become apparent subsequently, these air gaps 130 are larger than the air gap in the first embodiment. As may best be seen in FIGURE 5, the pole faces 126 are arranged in opposed relationship, with each north pole being aligned with a south pole. This will insure the flux extending straight across the air gap 130 between the registering pole faces 126.

In order to permit the simultaneous printing of a large number of lines, a plurality of similar armatures 132 may be disposed in the air gaps 130. By way of example, in order to permit the printing of ten separate lines, ten separate armatures may be provided in the air gaps 130. Each of the armatures 132 may be substantially identical to the armature 76 in the preceding embodiment. More particularly, each armature 132 includes a lightweight non-magnetic member such as a card of plastic, aluminum, copper, etc.

An electrically conductive winding 134 is provided on the surface of the armature 132 by well known printed circuit techniques or similar means. The winding 134 includes a plurality of substantially parallel upper conductors 136, a plurality of substantially parallel lower conductors 138, and a plurality of end conductors 140 connect the upper and lower conductors together to form a single continuous winding 134. The upper and lower conductors 136 and 138 are disposed between the pole faces 126 in the maximum flux density and at right angles to the lines of flux.

The opposite ends of the windings 134 are electrically connected to suitable connectors 142 mounted on the armatures 132. Each pair of connectors 142 may be connected to a source of the baseband signals. By applying the baseband signals between the pairs of connectors 142, electric currents circulate through the windings 134. These currents in the upper and lower conductors 136 and 138 will produce dynamic flux fields that will react with the permanent fields and produce forces on the armatures 132. It may be seen that since the printed circuits are all independent of each other, the baseband signals circulating in the armatures 132 can also be independent of the signals in the other armatures.

Figure 5:
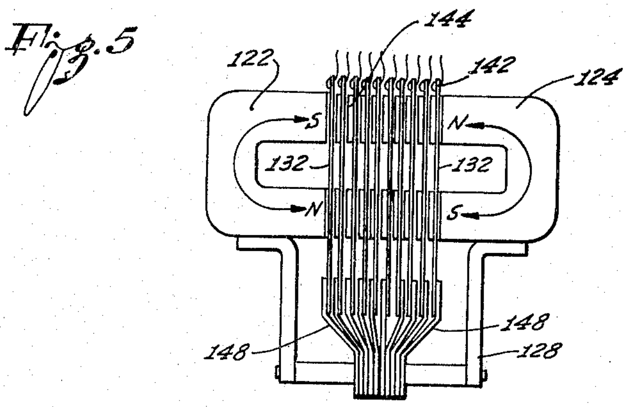
FIGURE 5 is a transverse cross-sectional view of the printing transducer of FIGURE 4.

Since the armatures 132 are slidably disposed in the air gap 130, the currents flowing through the upper and lower conductors 136 and 138 will react with the magnetic flux field and produce forces on the armatures 132 that are proportional to the magnitude of the current. These forces will tend to move the armatures vertically, as seen in FIGURES 4 or 5. It is to be noted that the currents flowing through the end conductors 140 will produce no vertical forces on the armatures.

It has been found desirable to provide spacer members 144 between the adjacent armatures 132. These members 144 have just sufficient widths to fill the spaces between the armatures 132 without interfering with the mechanical movement of the armatures. The spacer members 144 preferably have a high permeability. This will reduce the reluctance of the air gaps 130 and increase the intensity of the magnetic fields. This will increase the magnitudes of the forces produced on the armatures 132. It has also been found that if the spacers 144 have low reluctances, the possibility of cross-talk between the adjacent armatures 132 is virtually eliminated.

Each of the armatures 132 includes a stylus similar to the stylus 84 or other printing means such an apex 146. The apex 146 is adapted to ride on a pressure-sensitive writing material such as a piece of carbon paper. If spacer members 144 are provided between the adjacent armatures 132, there will be a considerable amount of space between the armatures 132. In order to reduce or eliminate any spacing between the printing, the apexes 146 may be mounted on the ends of offset arms 148. This will permit preselected clearance spaces to be maintained between between the various armatures 132 while, at the same time, permitting the successive lines scanned by the apexes 146 to be contiguous.

To employ the embodiment of the invention in FIGURES 4 and 5, the transducer means 120 may be mounted in a suitable facsimile system. By way of example, the printing means 120 may be mounted upon the yoke 24 of the transceiver 12 in place of the printing transducer means 10 in the first embodiment. Each of the various armatures 132 may then be electrically interconnected with a suitable source of facsimile signals. More particularly, if the printing transducer 120 is being used in a facsimile system, such as shown in FIGURE 1, the signals may be derived from a transceiver having pickup transducer means with a corresponding number of pickups for simultaneously scanning the same number of lines across the document. The baseband signals are carried to a receiving unit having the printing transducers therein. If a narrow band width transmission means is to be employed, the signals may be carried over a plurality of parallel telephone transmission lines. However, all of the facsimile signals may be multiplexed onto a single carrier.

As the printing transducer 120 scans across the pressure-sensitive writing material, the apexes 146 will indivodually scan separate parallel lines. Each of the armatures 132 will respond to its respective baseband signal and cause its respective apex 146 to independently apply approriate pressures to the pressure-sensitive writing material.

It may be seen that by employing printing transducer means having a large number of separate armatures 132, it is possible to simultaneously scan a wider area and reduce the time to print a facsimile while still maintaining the same amount of resolution, etc.

Figure 6:
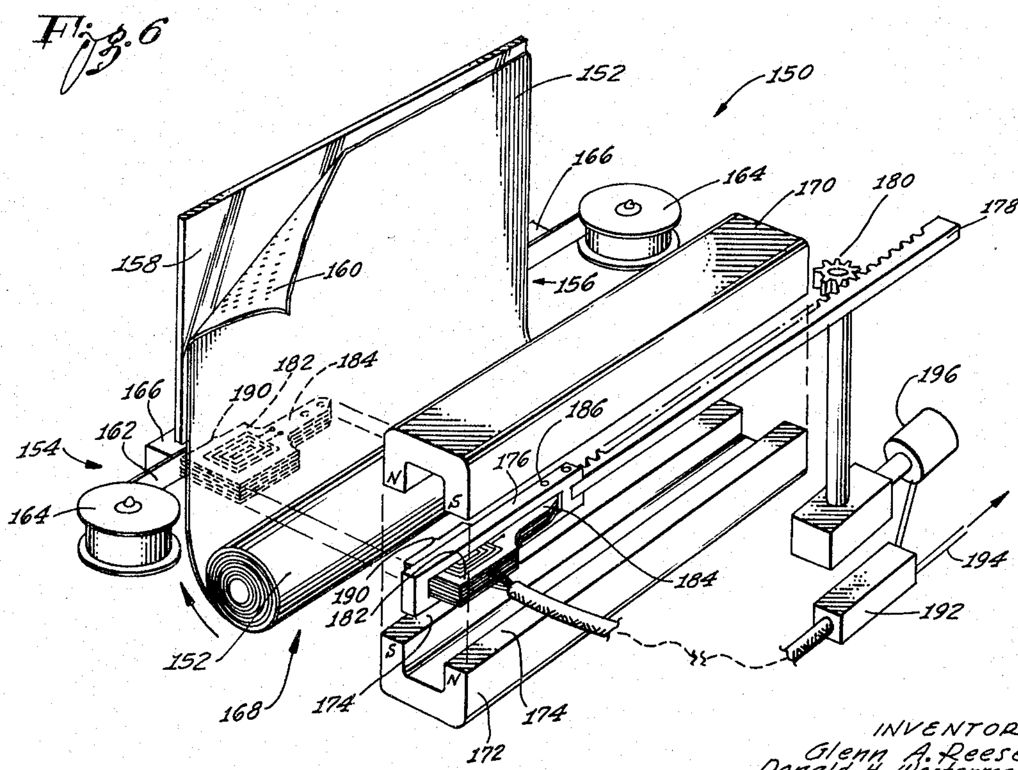
FIGURE 6 is an exploded perspective view of a receiving portion of a facsimile system employing a printing transducer embodying another form of the present invention.

As a further alternative, the facsimile system 150 disclosed in FIGURE 6 may be employed. This facsimile system 150 employs a continuous strip of blank copy paper 152 which may be rolled upon a suitable spool. During a printing operation, the copy paper 152 may be unwound from the spool and fed through a suitable printing station 154. A suitable guide 156 is disposed adjacent the printing station 154 for carrying the paper therethrough. If desired, the guide 156 may include a transparent member 158, such as a glass panel.

After the paper 152 has passed through the printing station 154, the writing surface 160 will advance along the glass panel 158 so as to be immediately visible to the operator.

The writing station 154 includes a pressure-sensitive writing material that is positioned immediately adjacent the writing surface 160 on the copy paper 152. In the present instance this includes an ink ribbon 162 wound upon a pair of spools 164. The ribbon 162 extends the full width of the copy paper 162 and lightly contacts the writing surface 160.

A stationary backing member 166 is positioned in front of the ink ribbon 162 and extends the full width of the copy paper 152. This backing member 166 helps maintain the ribbon 162 immediately adjacent the writing surface 160 and form a rigid backing against which a force may be applied.

Printing transducer means 168 is disposed behind the copy paper 152 to apply a pressure to the back of the copy paper 152. The pressure will force the writing surface 160 against the ribbon 162 and compress the ink ribbon 162 between the backing member 166 and the writing surface 160. This will, in turn, cause the writing material on the ribbon 162 to be transferred to the paper 152 and to become visible as the paper 152 advances along the transparent guide 158.

Although the printing transducer 168 may be similar to the preceding transducers, it has been found that the speed of printing may be greatly increased by employing a transducer similar to that shown in FIGURE 6. More particularly, this transducer 168 includes a pair of elongated permanent magnets 170 and 172 which correspond to the magnets 66 and 68 and 122 and 124. Each of the magnets 170 and 172 includes a pair of parallel pole faces 174. The magnets 170 and 172 are mounted in fixed positions immediately adjacent the printing station 154 and substantially parallel to the backing member 166. The pole faces 174 are aligned with each other to form air gaps that are also parallel to the backing member 166. The polarities of these pole faces 174 are reversed so that each north pole is aligned with a south pole and the flux fields extend straight across the air gaps between the pole faces 174.

A support member 176 is slidably mounted in the space between the two magnets 170 and 172. The support 176 is adapted to move longitudinally of the two magnets 170 and 172 substantially parallel to the backing member 166. This support 176 may be mechanically moved by any suitable means. However, in the present instance, a rack 178 is attached to the support 176 and meshes with a pinion 180. Thus, by rotating the pinion 180, the support 176 may be axially driven either way across the printing station 154.

A plurality of armatures 182 are mounted on the support 176 so as to be carried thereby. These armatures 182 may be similar to the preceding armatures. More particularly, each armature 182 includes a rigid card of non-magnetic material. An elongated arm 184 extends lengthwise of the armature 182 and is pivotally attached to the support 176 by means of a pin 186. This will allow the armatures 182 to independently swing around the pin 186 in directions normal to the length of the magnets 170 and 172.

A printed circuit is provided on each of the armatures 182. Each of the printed circuits includes conductors that are disposed in the flux fields between the pole faces. This will be effective to cause the currents circulating in the printed circuits to produce lateral forces on the armatures 182 which will cause them to rotate about the pin 186.

A separate stylus or apex 190 is provided on each of the armatures. The apexes 190 are positioned to engage the back of the copy paper 152 and ride thereacross as the support 176 is driven. Any forces which are produced on the armature 182 and directed toward the copy paper 152 will cause the writing surface 160 to be forced against the ink ribbon 162 so that a writing will be produced upon the writing surface 160 of the paper 152.

To employ this embodiment, the copy paper 152 is first threaded through the printing station 154, across the ink ribbon 162 and the transparent panel 158. The armatures 182 are then electrically interconnected with a suitable source 192 of baseband signals. This source 192 may be effective to generate its own baseband signal or may be energized by a cable 194 leading to a remote source. The source 192 is effective to energize the motor 196 so as to rotate the pinion 180 and position the support 176 adjacent one edge of the copy paper 152 with the apexes 190 disposed immediately adjacent the back of the copy paper 152.

As soon as the facsimile signals begin, the motor 196 will rotate the pinion 180 and drive the support 176 longitudinally of the magnets 172 and 174. This will cause the apexes 190 on each of the various armatures 182 to travel across the back of the copy paper 152 and scan its respective line. During this travel, the baseband electric signals are supplied to the printed circuits on the armatures 182. The apexes 190 on the armatures 182 will be individually forced outwardly toward the paper 152 and compress the paper 152 against the ribbon 162 and the backing bar 166. The pressure-sensitive writing will then be transferred onto the writing surface 160 on the paper 152.

After the support 176 has traveled the entire width of the paper 152, the motor 196 will rotate the pinion 180 in the reverse direction and rapidly drive the support 176 to the far end of the paper 152. At the same time, the copy paper 152 will be advanced a distance equal to the width of the line scanned by the armatures 182. Following this, the scanning operation may be repeated so as to scan a new line and print a new line of information. As soon as a line has been printed and the paper 152 advanced, writing surface 160 will be exposed through the transparent paper guide 158 whereby an operator may quickly view the printed matter as soon as the line has been scanned.

While only a limited number of embodiments of the present invention have been disclosed herein, it will be readily apparent to persons skilled in the art that numerous changes and modifications may be made thereto without departing from the spirit of this invention. Accordingly, the foregoing drawings and descriptions thereof are for illustrative purposes and do not in any way limit the scope of the present invention which is defined only by the claims which follow.

What is claimed is:

1. A system for recording an image on a copy paper, including the combination of:
a retainer for maintaining the copy paper in a scan position,
a magnetic circuit having an air gap with a flux field extending thereacross,
armature means movably disposed in said air gap and having electrically conductive means positioned in the flux field, said electrically conductive means being arranged so that an electrical current therein will create a force on said armature,
printing means positioned to scan the copy paper, said printing means being connected to the armature to exert a force against said copy paper as a function of said current for the recording,
a follower positioned to scan the copy paper with the printing means and responsive to the position of the copy paper, and
lost motion means connecting the follower to said armature means to thereby maintain the printing means positioned within a predetermined range of the copy paper.

2. A system for producing an image on a copy paper, including the combination of:
a support for maintaining the copy paper in a scan position,
a magnetic circuit having an air gap with a flux field extending thereacross,
a plurality of armature means disposed in the air gap and flux field,
separate printing means for each of the armatures, said printing means being positioned to simultaneously scan a plurality of parallel lines across the copy paper,
an electrical conductor on each of said armature means, said conductors being positioned in the flux field so that electrical currents in the conductors will create forces on the respective armatures proportional to its respective current, and
each of said printing means being effective to produce a force against the copy paper and print the respective lines on the copy paper in accordance with the application of such force.

3. A system for recording an image on a copy paper, including the combination of:
a retainer for maintaining the copy paper in a scan position,
a scan area on the retainer extending across the copy paper positioned on the retainer,
a magnetic circuit disposed in a fixed position adjacent the retainer,
a stationary air gap in the magnet circuit, said air gap being positioned adjacent the scan area and having a flux field extending thereacross,
a plurality of armatures disposed in said air gap and the flux field, and
means for simultaneously moving all of the armatures through the flux field and across the scan area,
each of the armatures including printing means positioned to ride across the scan area as said armatures move and simultaneously print lines on the copy paper.

4. A printing transducer for recording an image on a copy paper, including the combination of:
a support for moving relative to the copy paper,
a magnetic circuit on said support, said circuit including an air gap having a flux field extending thereacross,
armature means disposed in the air gap and flux field and providing, in response to an electrical signal, a force proportional to the signal,
printing means mounted on the support for scanning the copy paper during the movement of the support relative to the copy paper, said printing means being connected to the armature means and forced against the copy paper as a function of said signal, and
a follower mounted on the support and positioned to travel across the copy paper adjacent the printing means, and
lost motion means connected to the follower and one of said armature and printing means to position the printing means relative to the copy paper.

5. A printing transducer for recording an image on a copy paper, including the combination of:
a support for moving relative to the copy paper,
a magnetic circuit having an air gap with a flux field extending thereacross,
a plurality of armature means disposed in said air gap and movable relative to each other,
electrically conductive means on each armature positioned in the flux field so that an electrical current therein will create a force on said armature, and
separate printing means on each of said armature means for scanning the copy paper to simultaneously print separate lines on the copy paper.

6. A printing transducer for recording an image on a copy paper, including the combination of:
a support for moving relative to the copy paper,
a magnetic circuit having an air gap with a flux field extending thereacross,
a plurality of separate armature means disposed in the air gap and flux field,
separate electrical conductors on each of said armature means and positioned in the flux field so that electrical currents in the separate conductors will create separate forces on said armature proportional to said current,
each of the armature means including printing means for scanning the copy paper to record the image on the copy paper as a function of its respective current, and
magnetically permeable spacers disposed between the separate armature mean ands in the air gap.

7. In a system for recording an image on a copy paper,
retainer means for maintaining the copy paper in a scan position,
transducer means disposed adjacent the retainer means and movable in a particular direction to scan the copy paper, said transducing means including printing means disposed on the paper to print the image on the copy paper during the scan of the paper by the transducer means in accordance with variations in the pressure exerted by the printing means on the paper, and guide means movable with the transducer means during the scan of the paper by the transducer means to maintain the printing means positioned on the copy paper at all times for the recording of the image on the paper in accordance with the variations in the pressure of the printing means.

8. In the system set forth in claim 7, the guide means including means providing a lost motion for positioning the guide means on the copy paper during the scanning of the copy paper by the transducer means.

9. In a system for recording an image on a copy paper, retainer means for maintaining the copy paper in a scan position, magnetic means defining an air gap with a flux field extending across the air gap, armature means movably disposed in said air gap and having electrically conductive means positioned in the flux field to create a force on said armature means in accordance with the flow of current through the electrically conductive means, printing means connected to the armature to produce the image on the copy paper in accordance with the force produced on the armature, means connected to the electrically conductive means for producing at each instant through the electrically conductive means a flow of current representative of the image to be recorded on the copy paper at that instant, scanning means associated with the armature means and movable relative to the copy paper for obtaining a scan of the copy paper by the printing means, and guide means movable with the scanning member and disposed on the copy paper to position the printing means on the copy paper at all times during the recording of the image on the copy paper for the recording of the image on the copy paper in accordance with the force produced on the printing means at each instant.

10. In a system for recording an image on a copy paper, retainer means for maintaining the copy paper in an arcuate scan position, support means positioned adjacent the retainer means for rotating relative to the copy paper to scan the copy paper, magnetic means carried by the support means and including an air gap with a flux field extending across the air gap, armature means movably disposed in said air gap and the flux field, an electrical conductor on said armature means and disposed in said air gap for producing a movement of the armature means in said air gap in accordance with the flow of current through the conductor, printing means carried by the support means and connected to the armature means for printing the image on the copy paper in accordance with the movements of the armature means, means connected to the support means for obtaining a rotation of the support means, means connected to the electrical conductor for producing at each instant through the electrical conductor a flow of current representative of the image to be recorded at that instant, follower means carried by the support means and positioned to travel on the copy paper in accordance with the rotation of the support means, and means connecting the follower means to said armature means to position the printing means in a particular relationship to the copy paper.

11. In a system for recording an image on a copy paper, support means defining an arcuate configuration for maintaining the copy paper in an arcuate scan position, transducer means positioned adjacent the support means for moving in an angular pattern relative to the copy paper to scan the copy paper, printing means carried by the transducer means for recording the image on the copy paper during the angular scan, means connected to the transducer means for producing a movement of the transducer means in the angular pattern, means connected to the printing means for operating upon the printing means to obtain a recording of the image on the copy paper by the printing means, and guide means carried with the transducer means and engaging the support means during the movement of the transducer means in the angular pattern for positioning the printing means in a particular relationship to the copy paper during the movement of the transducer means in the angular pattern.

12. In the system set forth in claim 11, lost motion means being coupled to the guide means to facilitate the positioning of the printing means in the particular relationship to the copy paper.

13. In a system for recording an image on a copy paper, support means for maintaining the copy paper in a scan position, magnetic means defining an air gap with a flux field extending across the air gap, a plurality of armature means individually disposed in said air gap and individually movable relative to each other, a plurality of electrically conductive means each disposed on an individual one of said armature means, each of said conductive means being positioned in the flux field and being responsive to an electrical current to produce a force on its associated armature means in accordance with such electrical current, means coupled to the armature means in the plurality for obtaining a scan of the copy paper by the armature means, means individually coupled to the electrically conductive means in the plurality for introducing at each instant to the individual electrically conductive means electrical currents representative of the image to be formed by the associated one of the individual armature means at that instant, and a plurality of printing means each individually coupled to a different one of the armature means and disposed relative to the copy paper to record an image at each instant in accordance with the force produced on the associated one of the armature means at that instant.

14. In a system for recording an image on a copy paper, support means for the copy paper, the support means being disposed in an arcuate configuration to retain the copy paper in the arcuate configuration defined by a particular axis, transducer means rotatable past the copy paper on the support means for recording the image on the copy paper during such rotation, resilient means on the support means for pressing the copy paper against the support means, control means operatively coupled to the resilient means and movable between first and second positions for providing for an insertion of the copy paper on the support means and a disposition of the resilient means away from the support means in the first position and for providing for the pressure of the resilient means against the support means in the second position after the insertion of the copy paper on the support means, and means for obtaining a movement of the copy paper and the resilient means on the support means along the particular axis during the rotary scan of the copy paper by the transducer means.

15. In the system set forth in claim 14, the resilient means constituting a flexible sheet of material disposed over the copy paper upon the insertion of the copy paper on the support means.

16. In the system set forth in claim 15, guide means disposed on the resilient sheet and rotatable with the transducer means for positioning the transducer means in a particular relationship to the copy paper.

References Cited

UNITED STATES PATENTS

| | | | |
|---|---|---|---|
| 2,447,473 | 8/1948 | Finch | 346—127 X |
| 2,785,039 | 3/1957 | Artzt | 346—101 |
| 3,164,435 | 1/1965 | Grafstern et al. | 346—139 |
| 3,210,466 | 10/1965 | Day | 346—77 X |
| 3,270,349 | 8/1966 | Murphy | 346—46 |

RICHARD B. WILKINSON, *Primary Examiner.*

J. W. HARTARY, *Assistant Examiner.*